United States Patent [19]

Day et al.

[11] Patent Number: 4,893,576
[45] Date of Patent: Jan. 16, 1990

[54] MARINE FENDER

[75] Inventors: John T. Day, Winfield; Robert O. Herder, Easton; Robert B. McNatt, Annapolis, all of Md.

[73] Assignee: Rubber Millers, Inc., Baltimore, Md.

[21] Appl. No.: 941,149

[22] Filed: Dec. 12, 1986

Related U.S. Application Data

[63] Continuation of Ser. No. 467,241, Feb. 17, 1983, Pat. No. 4,628,850, which is a continuation-in-part of Ser. No. 352,255, Feb. 25, 1982, abandoned.

[51] Int. Cl.⁴ .............................................. B63B 59/02
[52] U.S. Cl. ................................. 114/219; 264/263; 405/212
[58] Field of Search ............... 114/219, 220; 405/212, 405/215; 441/1, 6; 264/263; 285/284, 297

[56] References Cited

U.S. PATENT DOCUMENTS

| | | | |
|---|---|---|---|
| 2,492,823 | 12/1949 | Young | 285/297 |
| 3,063,400 | 11/1962 | Yamaguchi et al. | 114/219 |
| 3,113,546 | 12/1963 | Mountcastle | 114/219 |
| 3,339,907 | 9/1967 | Parker | 114/219 |
| 4,136,632 | 1/1979 | Day et al. | 114/220 |
| 4,261,947 | 4/1981 | Ogi | 264/263 |
| 4,304,038 | 12/1981 | Yabu et al. | 285/284 X |
| 4,628,850 | 12/1986 | Day et al. | 114/219 |

Primary Examiner—Sherman D. Basinger
Attorney, Agent, or Firm—A. W. Breiner

[57] ABSTRACT

A fender for marine use having an outer flexible elastomeric shell and containing therein a solid foam bun, and its method of construction is described. The method includes forming the shell in two halves, inserting the solid foam bun into the two halves, and thereafter molding the two halves into an integral unit. The marine fender has excellent flexibility and structural integrity.

9 Claims, 3 Drawing Sheets

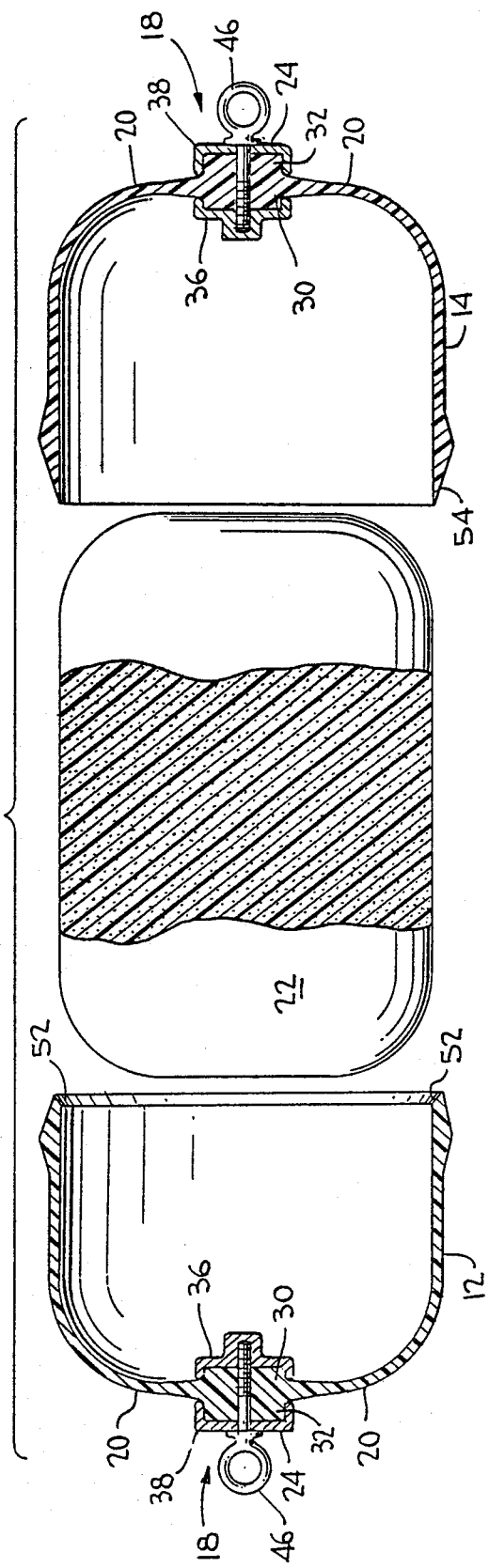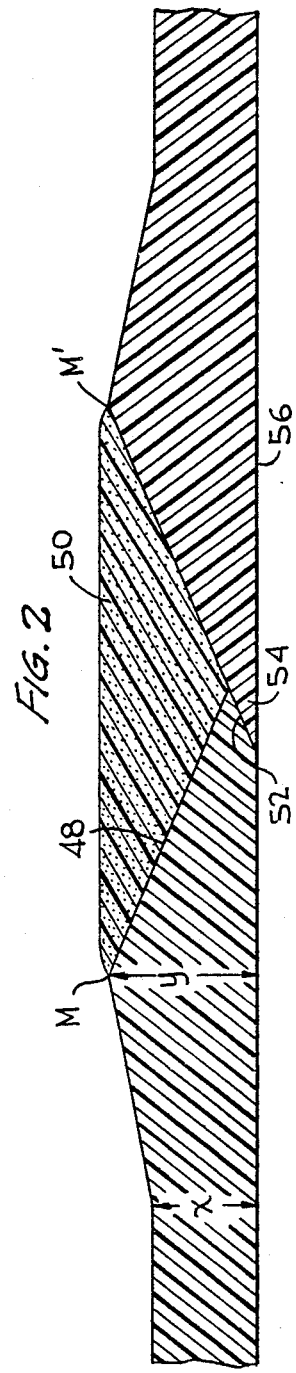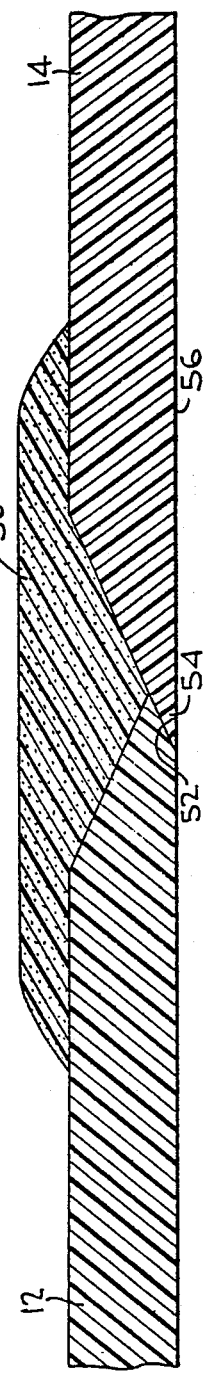

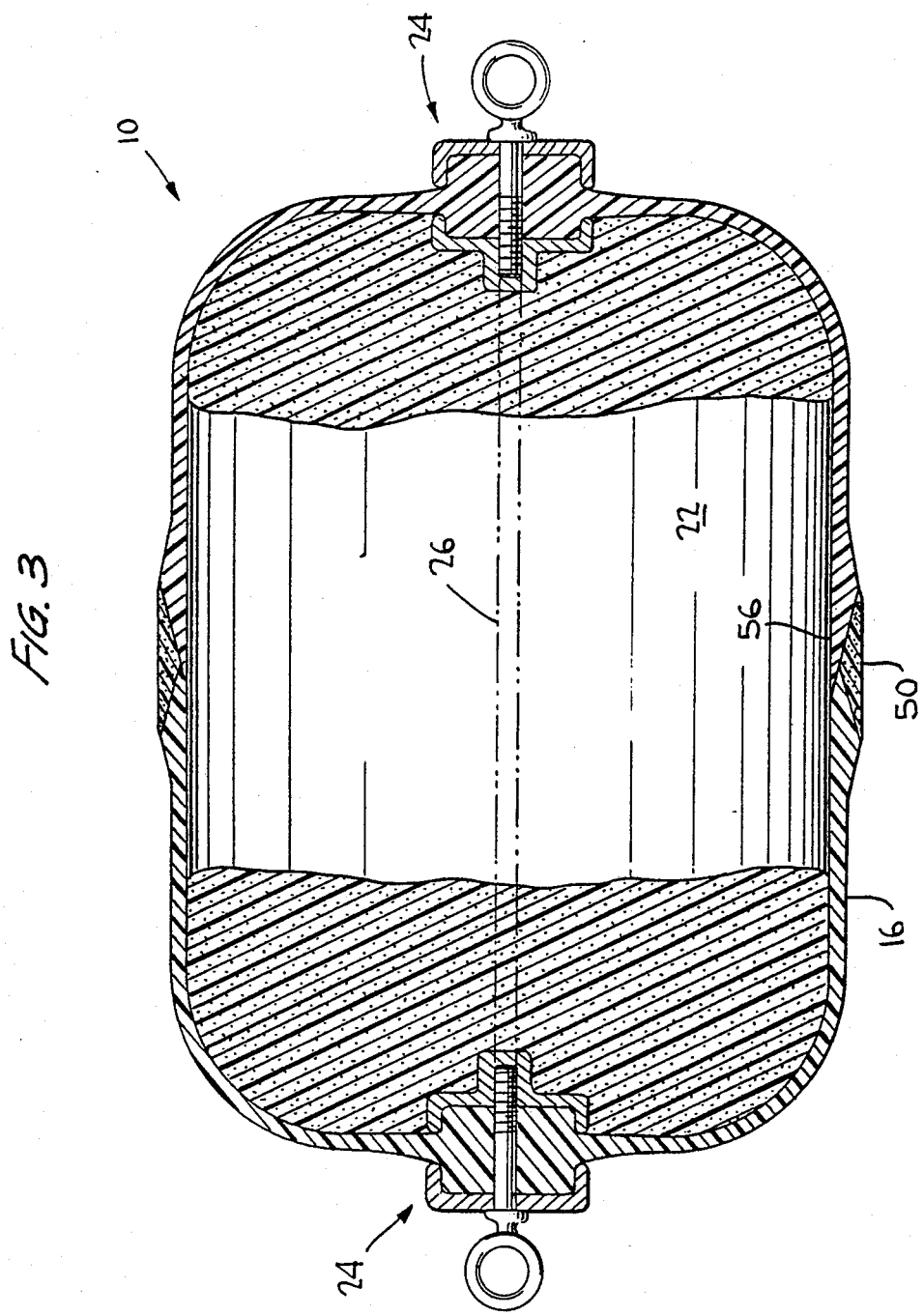

MARINE FENDER

This is a continuation of application Ser. No. 06/467,241 filed Feb. 17, 1983, now U.S. Pat. No. 4,628,850 which in turn is a continuation-in-part of application Ser. No. 06/352,255 filed Feb. 25, 1982, now abandoned.

STATEMENT OF INVENTION

This invention relates to improved fenders for marine use and to their method of manufacture. More particularly, this invention relates to a marine fender having a unitary elastomeric shell containing therein a solid foam bun, and to the method of manufacturing the fender.

BACKGROUND OF INVENTION

Marine fenders are used extensively by the military as well as by merchant mariners. Many of these fenders are very large and, additionally, are subjected in usage to conditions including extreme compressive and tensile forces resulting in an elongation of the fender. A problem associated with marrine fenders is the rupture of the fender during use, including separation where the body of the fender is attached to mooring fittings which form an essential part of the fender, and/or a failure of the fender to provide necessary protection to a ship or boat utilizing the fenders to avoid damage during docking or mooring. U.S. Pat. No. 4,136,632 discloses one fender designed to avoid the above-stated problems. The fender of the aforesaid patent comprises an outer flexible shell forming a chamber composed of a single piece of homogeneous elastomeric material; a compressible buoyant material within the chamber, and mooring fittings attached to the shell. Although not treated in detail in the patent, the fenders are formed by molding the shell as a unit, followed by insertion of particulate foam material and mooring fittings into or onto the shell. Although an improvement over earlier marine fenders, the fenders described in U.S. Pat. No. 4,136,632 still have shortcomings in that the fenders are costly to manufacture, particularly with good quality control; and, further, the particulate nature of the foam material within the shell chamber is a less efficient form.

OBJECTS OF AND SUMMARY OF INVENTION

Accordingly, it is a primary object of the present invention to provide an improved fender having high resistance to compressive and tensile forces without tear or rupture, or a pulling out of the mooring fittings.

It is another object of this invention to provide a method of manufacture of an improved fender for marine use which is simple and which permits good quality control.

These and other objects of this invention will be apparent from the following description particularly the drawing and preferred embodiment.

In summary, the objects of the present invention are accomplished by fabricating a fender for marine use comprising a unitary elastomeric shell having two ends and a cavity at each end of the shell. The cavity is dimensioned to be less than about twenty-five (25%) percent of the diameter of the shell. Mooring fittings are fitted into each of the cavities. The fact that the cavities are restricted in size provides greater resistance to compressive and tensile forces which are applied to the fender. Contained within the shell is a solid flexible foam bun. The bun is dimensioned to have a diameter substantially as great as the internal diameter of the shell, and a length substantially as great as the internal length of the shell. The close fitting of the bun within the shell and the fact that the bun is a solid flexible foam provides greater utilization of the energy-absorbing properties of the foam. The solid foam bun also imparts a factor of safety in the unlikely event of total failure of the elastomeric shell.

The fender is fabricated by molding two substantially equal or like halves. Each of the shell halves has an end cavity at one end of the shell half dimensioned to be less than about 25 percent of the diameter of the shell half and the ultimate diameter of the fender. The other end of the shell half is completely open. Preferably each of the shell halves has at its completely open end an enlarged section. These enlarged sections are molded so that the end sections of the two halves will mate to form a recessed area bounded by a raised portion which permits joining of the two ends of the two halves. It is essential that the joinder of the two halves provides a substantially smooth internal center portion. This permits the insertion of a solid bun into the shell halves when the bun has substantially the same diameter as the interior of the shell. The solid bun is inserted into the shell halves whereby the enlarged sections are mated. To join the two halves, a band mold is positioned around the enlarged sections including over and in sealing engagement with the recessed area. A liquid thermoset elastomeric material compatible with the material of the elastomeric shell is cast into the recessed area sealed by the band mold. The cast elastomer is cured to provide a unitary structure. Although at times preferred, it is not essential to form the shell halves with the enlarged end section. It is possible to have the shell halves formed with a uniform thickness and then bevel or taper the ends of the halves to mate and form a recessed area. To join the two halves a band mold having an enlarged area is fitted around the end and a liquid elastomer is cast into the band molds to provide a built-up section.

Prior to bun insertion and joining of the shell halves, the fender is fitted with mooring fittings. Preferably the end cavity of each shell half will have raised bosses and mooring fittings fitted onto these raised bosses. The fittings can be conveniently inserted using cup-shaped members, preferably to engage the bossed portions of the elastomeric shell to provide durable fittings. Accordingly, the marine fender, because of its overall structure, has high resistance to compressive and tensile forces and, additionally, is easily fabricated, permitting good quality control in the fabrication.

THE DRAWING AND DETAILED DESCRIPTION OF THE PREFERRED EMBODIMENT

In the drawing,

FIG. 1 is an exploded view, partly in section, of a marine fender according to the present invention;

FIG. 2 shows, in cross-section, an enlargement of the joinder area of the two halves of the elastomeric shell in sealing engagement wherein the shell halves at the point of joinder have a greater thickness and with the recessed area filled with polymeric material;

FIG. 3 is a cross-sectional view of a finished fender showing in phantom lines a bore in the foam bun for containing a flexible support member;

Figure 5:
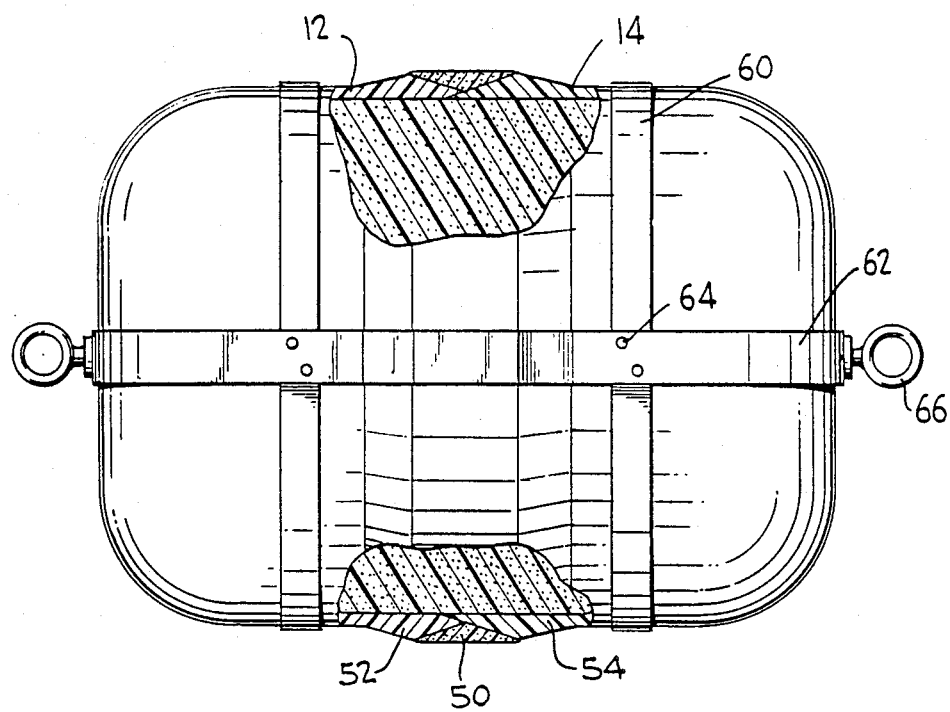

FIG. 4 shows, in cross-section, an enlargement of the joinder area of the two halves of the elastomeric shell wherein the half shell ends at point of joinder are of uniform thickness with the body of the shell and with the recessed area filled with polymeric material; and FIG. 5 shows, in partial cut-away section, another embodiment of a marine fender utilizing the method of manufacture of the present invention.

Referring to the drawing, a fender 10 fabricated in accordance with this invention has a generally cylindrical shape and comprises shell halves 12 and 14 having end bosses generally at 18; a solid foam bun 22, and mooring fittings 24 which function to close the shell cavity and provide a means of securing the fender to a ship or boat. As shown, bun 22 is solid and integral, substantially having the dimensions of the interior of the shell 16 (FIG. 3) formed from shell halves 12 and 14. As shown, shell halves 12 and 14 have at the cavity end a progressively thickened section 20 finalized in internal and external lip sections 30 and 32. Lip sections 30 and 32 are joined together with mooring fittings 24 comprising internal cup members 36 and external cup members 38. These internal and external cup members enclosing lip sections 30 and 32 are connected together by bolt means 46 passing through external cup member 38 and threadedly engaged into internal cup member 36.

As best illustrated in FIG. 2, shell halves 12 and 14 are mated and joined to form a joinder having a recessed area 48 which is filled with polymer 50. As shown, the shell half 12 has a cut-away section 52, and shell half 14 has a mating, extending section 54. On joinder, a seal for retaining polymer 50 is provided while retaining a smooth interior surface 56. A band mold, not shown, having an opening for injection of a liquid polymer material is placed around the joinder area. Thereafter, a liquid reactive material 50 is cast into the recessed area and cured. The final fender, as shown in FIG. 3, comprises a unitary shell 16. However, the bun 22 is solid, providing greater energy-absorbing qualities and structural integrity to the fender. Since it is possible to have end cavities 18 relatively small in diameter in comparison to the diameter of the fender, i.e., of less than about 25 percent of the diameter of shell 16, the cavities are easily closed with mooring fittings. Since the diameter of the opening is smaller, the force applied against the fitting is not as likely to cause rupture in comparison to when having a larger opening. Moreover, the enlarged lip sections or bosses 30 and 32, particularly with the progressive thickening as the shell approaches the lip area or bosses, in co-action with cup member fittings 36 and 38 provide high resistance to pull-out of the polymer shell from the fittings regardless of the force exerted on the fittings or the forces exerted on the foam bun. Although not essential, it is possible to drill a bore in the solid foam bun and place a chain or other suitable support within the bore 26 and connect the chain or support at each end to the mooring fittings. Note FIG. 3.

Referring primarily to FIG. 2, the thickness of shells 12 and 14 at point X will range from about 0.3 to 2 inches depending upon the size of the fender. The thickness at point Y should be between about 25 percent to 50 percent greater than the thickness at point X. The length of the cavity M—M' as shown in FIG. 2 is not critical other than to the extent that the length of the cavity must be sufficiently great to provide a good bond and seal between the polymer 50 in the cavity area 48 and shell sections 12 and 14. The utilization of cut-out section 52 and mated extending section 54 enhances the seal and, furthermore, provides improved structural strength of the bond. The region of transition between the shell proper and the lip portions 30 and 32 is proportioned to distribute the stretching of the shell over the whole of the shell ends to prevent concentration of stretching in the area immediately adjacent the lips. Since the cavity 18 is relatively small, the transition region can be relatively short and accommodated in the region before the end curvature of the shell. Note that the purpose of this thickened portion reduces the effect of possible stress concentrations at the joinder planes.

In the fabrication of the marine fender of this invention, shell halves 12 and 14 are separately formed in a suitable mold. After the shell halves are molded and partially cured, the shell ends which are to be joined are washed at the point of joinder, i.e., in the area of M—M', to remove all release agents. The joinder area is abraded to ensure complete removal of release agent and to increase the surface area. Thereafter, the joinder area is washed with a solvent such as methylethylketone (MEK) in the case where the elastomeric material is a polyurethane such as duPont's ADIPRENE L-100 to cause the urethane elastomer to swell slightly. In the event a different polymeric elastomeric material is utilized, a different solvent material may be preferable. Thereafter, a primer—which in the case of the elastomeric shell being ADIPRENE L-100 is a mixture of ADIPRENE L-100 and MEK, preferably being from about 1 to 9 parts ADIPRENE L-100 to MEK and, optimally, being from about 4 parts ADIPRENE L-100 to 6 parts MEK—is applied to the joinder area. The shell is preferably placed in an oven at approximately 100° C. to remove all of the MEK solvent to provide a tacky surface. A band mold is placed around the joinder area and ADIPRENE L-100 polymer and curative is cast into the cavity area. After casting the polymer is allowed to cure. The curing can be accomplished according to available conditions. Preferably the curing can be accelerated by placing the shell into an oven and heating the shell at a temperature of from about 100° C. The length of the cure depends upon the temperature of cure. If the temperature is at 100° C., a good cure can be obtained in the period of from one to six hours. If at a lower temperature, longer cure times are required.

As above indicated, the polyurethane elastomers have been found to be highly successful in forming the fender. ADIPRENE L-100 marketed by E. I. duPont de Nemours & Co., Inc., in combination with the curative MOCA which is 4,4'-methylene-bis-2-chloroaniline is particularly preferred. Other elastomeric materials, however, can be utilized in the formation of a polymer shell.

FIG. 4 is substantially similar to FIG. 2. However, in FIG. 4, as seen, the shell halves do not have an enlarged thickness at the point of joinder. Rather, the ends are beveled to form a recess for collection of cast elastomer. The cast elastomer as a result of the configuration of the band mold is built-up around the recess to a greater diameter or thickness than the shell body forming a durable seal. This method of joining the two halves is convenient in that it can be used to repair fenders which are ruptured or torn at virtually any part of the fender.

As shown in the drawing, the shell has a slightly raised area at the point of joinder at the external surface of the shell. However, the interior surface of the shell is smooth, or substantially smooth, which is desirable from the standpoint of strength and, further, from the standpoint of inserting the solid bun 22 into the shell. The smooth surface permits the utilization of a bun having substantially the same diameter as the interior diameter of the shell 16. The shell and the overall fender has a good appearance without need for smoothing of the exterior surface at the point of joinder.

The fender of the present invention, because of the unitary elastomeric shell, the solid foam bun and small cavity openings which are encapsulated by mooring fittings; possesses great structural strength and can be easily fabricated in sizes ranging from four feet and more in diameter, and six feet and more in length. Obviously, the shell can be provided in sizes as small as desired.

It is possible, utilizing a part of the concept of the present invention, to mold the progressively thickened sections 20 having the enlarged lip portions or bosses 30, 32 as separate strip sections and joining these strip sections to fender body portions by building the fender body portion onto these end sections by the spraying of a resinous component, either with or without strengthening with filaments, onto the strip sections. The mooring fittings can then be inserted onto the end units to form the complete fender.

Furthermore, it is also possible utilizing the method of fabrication of the present invention to provide a fender as illustrated in FIG. 5. As shown in FIG. 5, two end halves 12 and 14 are molded together with material 50. As shown, the end halves do not have a cavity at the end opposite of the open end of the halves for receiving a mooring assembly. Rather, the fender, after joining the end halves, are wrapped with longitudinal band 60 carrying a mooring fitting 66 and transverse bands 60. Bands 60 and 62 are connected together with rivets 64. This configuration is not as advantageous as the embodiments shown in FIGS. 1-4. However, where the force being applied to mooring fitting 66 is not particularly critical, this type of fender utilizing the concept of the present invention can be employed.

It will be apparent to one skilled in the art that various modifications can be made in the structural aspects of the marine feneer and in its method of fabrication. These modifications being within the ability of one skilled in the art are intended to be covered by the appended claims.

It is claimed:

1. A fender for marine use comprising a unitary elastomeric shell having two ends and a cavity at each end thereof, said unitary shell having been formed by joining two sections each having one of said two ends and said cavity being less than about 25 percent of the diameter of said shell; mooring fittings fitted onto each of said cavities and interconnected, and contained within said shell a solid, flexible foam bun, said bun having a diameter substantially as great as the internal diameter of said shell and a length substantially as great as the internal length of said shell, said shell including a thickened area where said shell sections are joined substantially equal distance from each of said ends.

2. The fender of claim 1 wherein the elastomeric shell is a homogeneous polyurethane elastomeric shell.

3. The fender of claim 2 wherein the cavity in each end of said elastomeric shell is bounded by thickened internal and external lip or boss portions, and said internal and external lip or boss portions are engaged in said mooring fittings to close said cavity at each end of said shell.

4. The fender of claim 3 wherein said mooring fittings comprise an internal cup member fitted around the internal lip portion and an external cup member fitted around the external lip portion, said internal and external mooring members being secured together.

5. The fender of claim 4 wherein said bun includes a cavity extending from one end to the other end thereof, and having contained therein a flexible tension member, said tension member being attached at each end to a mooring fitting.

6. The fender of claim 5 wherein said tension member is a chain.

7. The fender of claim 1 wherein said bun is polyethylene foam.

8. A fender for marine use comprising a unitary elastomeric cylindrical shell having two ends and contained within said shell a solid, flexible foam bun, said bun having a diameter substantially as great as the internal diameter of said shell and a length substantially as great as the internal length of said shell, said shell having been formed by joining two sections each having one of said two ends and including a thickened area spaced between said ends where said sheel sections are joined.

9. The fender of claim 8 wherein said thickened area is spaced substantially equal distance from each of said ends.

* * * * *